Oct. 19, 1965  J. L. KELLER  3,212,341

ACCELEROMETER APPARATUS

Filed April 11, 1963

INVENTOR.
JACK L. KELLER
BY
ATTORNEY

United States Patent Office 3,212,341
Patented Oct. 19, 1965

3,212,341
ACCELEROMETER APPARATUS
Jack L. Keller, New Hyde Park, N.Y., assignor to Sperry Rand Corporation, Great Neck, N.Y., a corporation of Delaware
Filed Apr. 11, 1963, Ser. No. 272,471
8 Claims. (Cl. 73—503)

This invention relates in general to accelerometers and in particular to an extremely lightweight integrating accelerometer that is substantially insensitive to ambient temperature changes.

In providing such an accelerometer the present invention utilizes to advantage a single gaseous, e.g., air, medium for two different and totally unrelated purposes. For example, in the accelerometer of the present invention a cylindrical bobbin or float is encased in a cylinder having a slightly larger inner diameter than the bobbin outer diameter. By providing the bobbin with a radially off-center, but axially central, center of gravity, it (the bobbin) floats as an air bearing on a film of air. By providing narrow orifices at the opposing ends of the cylinder, air is forced out of and sucked into the cylinder when the cylinder is axially accelerated to provide "acceleration" integration: the second use of air. Since the viscosity of air (and other gases too) is substantially constant over a wide range of temperatures, the viscosity-dependent air bearing action and integrating effect of air moving through the orifices are both substantially unaffected by changing ambient temperatures. These and other features of the invention will be described in detail later.

A principal object of the invention is to provide an accelerometer that is substantially insensitive to ambient temperature variations.

Another object of the invention is to provide an extremely light weight accelerometer.

Another object of the invention is to provide an accelerometer that utilizes the same gaseous medium for two entirely different and unrelated purposes.

Figure 1:
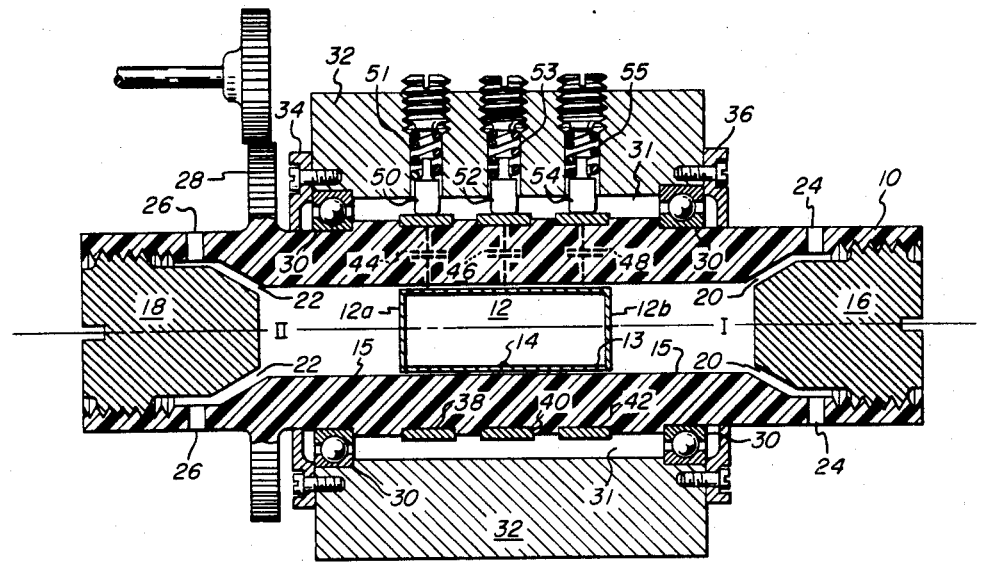
Figure 2:
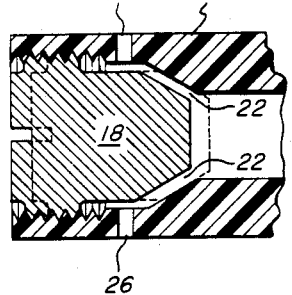
Figure 3:
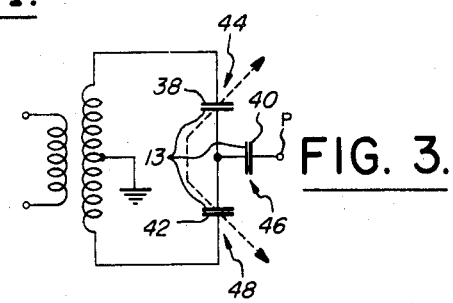
Figure 4:
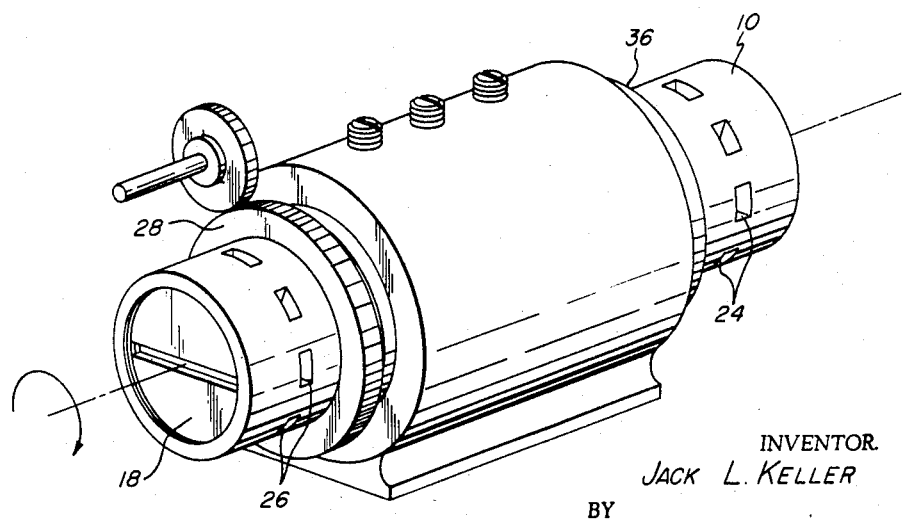

The invention will be described with reference to the figures wherein:

FIG. 1 is a partially schematic, sectional view of an accelerometer embodying the invention, FIG. 2 is a diagram useful in understanding how the dimensions of the aforementioned orifices may be adjusted, FIG. 3 is a schematic diagram of a pick-off employed with the accelerometer of FIG. 1, and FIG. 4 is a perspective view of the accelerometer of FIG. 1.

Referring to the fiugres, a cylindrical member 10 of electrically nonconductive material is adapted to contain a cylindrical bobbin 12. The bobbin 12 is provided with a radially off-center, axially central center of gravity located at 14 and, in this form of the invention, is provided with an electrically conductive skin 13. The clearance between the circumferential face of the bobbin 12 and the inner wall 15 of the cylindrical member 10 is deliberately made extremely close, on the order of .0001 inch. In its presently preferred form the bobbin 12 is hollow and of aluminum, having an outer diameter of about a quarter of an inch, a length of about a half inch, and a weight of approximately equal to .04 ounce. At the opposing ends of the cylindrical member 10 are conically shaped plugs 16 and 18, each of which may be screwably moved axially to seal off or open respective air conduits 20 and 22. In its preferred form, the accelerometer of the present invention uses plugs which are of such different material from the material of the cylindrical member 10 that the plugs and cylindrical member cooperate thermostatically to enlarge and reduce the dimensions of the air conduits 20 and 22 when ambient temperatures increase and decrease, respectively. This tends to compensate for even slight gas viscosity changes with temperatures, a manner of change, which incidentally is opposite to the manner in which liquid viscosities change with temperature, i.e., an ambient temperature increase causes gas viscosities to increase, and vice versa. FIG. 2 shows by means of dashed lines the particular way in which axial movement of a plug (16 or 18) permits adjustment of the dimensions of its respective air conduit. The conduit 20 carries air to and from an orifice 24; the conduit 22 carries air to and from an orifice 26. Each conduit, by means of the plugs 16 and 18, is adjusted to about .001 inch so that axial movement of the bobbin 12 forces air primarily through the conduits, leakage from one side of the bobbin to its other side through the .0001 clearance between the bobbin face and cylinder wall being negligible. A gear 28, provided on the cylindrical member 10, is used to rotate the cylindrical member 10 about its axis.

The cylindrical member 10 is supported for rotation within the bore 31 of a stator 32 by means of bearings 30, the stator 32 having bearing restraining rings 34 and 36 connected thereto. The cylindrical member 10 is axially constrained within the bore 31 of the stator 32 by the bearings 30, which also take up axial loads.

Three annular rings 38, 40 and 42, all of conductive material, are embedded in the nonconductive cylindrical member 10 and cooperate (the cylindrical member 10 and air acting as dielectric media) with the conductive bobbin 12 as a common conductor to form effectively three capacitors 44, 46 and 48, all shown by means of dashed lines. Spring loaded brushes 50, 52 and 54, in respective sleeves 51, 53 and 55 in the stator 32, bear against the conductive rings 38, 40 and 42, whereby a pick-off transducer circuit similar to that shown in FIG. 3 may be provided (related parts of FIGS. 1 and 3 having the same reference numerals). Axial movement of the bobbin 12 toward either plug 16 or 18 causes the capacitances of the capacitors 44 and 48 to change, i.e., one capacitance increases while the other capacitance decreases, the capacitance of the capacitor 46 being substantially invariant so long as the extreme end faces 12a and 12b of the bobbin 12 do not axially align with part of the conductive ring 40. For this reason, the circuit of FIG. 3 is shown having two variables and one fixed capacitor. By exciting the pick-off circuit in the manner shown in FIG. 3, a signal appears at part P having a phase and amplitude indicative respectively of the direction and magnitude that the bobbin 12 is displaced from a neutral position.

Rotation (at a sufficient rate, e.g., 10 r.p.m.) of the cylindrical member 10 as shown in FIG. 4 causes a film of air to be forced between the bobbin face 13 and the wall 15 of the cylindrical member 10, thereby creating air bearing action between such members and permitting substantially frictionless movement of the bobbin 12 along the axis of the cylindrical member 10. Were the center of gravity 14 of the bobbin 12 not radially displaced from the geometrical center of the bobbin, it (the bobbin) would tend to rotate with the rotating cylindrical member 10 because of viscous drag, i.e., laminar flow of air in the air film itself would cause the bobbin to follow the rotating cylindrical member 10, the net result being that there would be substantially no relative rotation between elements 10 and 12, and air bearing action would be lost. With the bobbin 12 center of gravity displaced in accordance with the invention, however, relative rotation between the bobbin 12 and cylindrical member 10 is forced, this being because the tangentially acting viscous drag force on the circumference of the bobbin 12 is insufficient to overcome the torque provided by the displaced center of gravity acting through the radius of the bobbin 12.

To appreciate how the air medium is used in the instant accelerometer to provide a signal representing integrated acceleration, i.e., velocity, consider the following: With the stator 32 so secured in a vehicle, the velocity of which is to be measured, that the axis of the cylindrical member 10 is aligned in the direction of the vehicle velocity vector, acceleration of the vehicle in such direction causes the bobbin 12, because of its inertia and substantially frictionless realtionship within the cylindrical member 10, to drift along the axis of the cylindrical member toward one plug (16 or 18) and away from the other. As such drift brings the bobbin 12, say, relatively close to the plug 16, the air pressure in the volume I bounded by the plug 16 and the bobbin face 12b increases, whereas the air pressure in the volume II bounded by the bobbin face 12a and the plug 18 decreases. These pressure changes are proportional to vehicle acceleration and, because air inlet and outlet paths through conduits 20 and 22 are provided, cause air to be forced out of and sucked through the orifices 24 and 26 respectively at pressure representative rates. These air flow rates are, in turn, proportional to the rates that the volumes I and II change, i.e. the areas A of the faces 12a and 12b multiplied respectively by the relative axial velocity of the bobbin 12 within the cylindrical member 10

$$\left(\frac{dV_{\mathrm{I}}}{dt}=A\frac{dx}{dt} \text{ and } \frac{dV_{\mathrm{II}}}{dt}=-A\frac{dx}{dt}\right.$$

where $dx/dt$ is representative of the bobbin relative axial velocity inside the cylindrical member). In other words, bobbin velocity along the axis of the cylindrical member 10 is proportional to the vehicle acceleration and, as a corollary, axial displacement of the bobbin inside the cylindrical member 10 (as determined by the pick-off transducer capacitors 44, 46 and 48) is indicative of the vehicle velocity.

While the invention has been described with respect to its presently preferred form, it is to be realized that apparatus embodying the invention may take many other forms. For example, instead of using conically shaped plugs 16 and 18 to provide air conduits, other type air escape techniques can just as easily be employed, e.g., simple pin holes of certain diameters at the opposing ends of the cylindrical member 10. Further, since the instant accelerometer requires a gaseous environment for its use, such can be assured by simply encasing the whole structure in a gas-filled container thereby overcoming what might be considered a shortcoming for use in a nongaseous environment, e.g., outer space. Likewise, the invention as described presupposes that air escaping in and out of the orifices 24 and 26, not only can provide the necessary acceleration-integration effect, but is sufficient to damp bobbin motion. However, should such damping be insufficient, additional and other means can be provided to enhance damping, e.g., a magnetic field oriented perpendicular to the axis of the cylindrical member 10 can be employed to provide eddy current damping.

While the invention has been described in its preferred embodiments, it is to be understood that the words which have been used are words of description rather than of limitation and that changes made within the purview of the appended claims may be made without departing from the true scope and spirit of the invention in its broader aspects.

What is claimed is:

1. Accelerometer apparatus for use in a gaseous environment comprising means having a cylindrical channel closed at opposing ends except for narrow openings, means for rotating said means having a cylindrical channel about the axis of that channel, and cylindrical bobbin means having a diameter slightly less than the diameter of said cylindrical channel and having a center of gravity radially displaced from the geometrical center of said bobbin means, said center of gravity being however approximately at the axially central part of said bobbin means, whereby rotation of said means having a cylindrical channel creates a circumferential film of gas between that means and said bobbin means, acceleration of said means having a cylindrical channel along the axis of said channel causing said bobbin means to be axially displaced within said cylindrical channel in proportion to the instantaneous velocity of said means having a cylindrical channel.

2. An integrating accelerometer for use in an atmosphere of gas comprising first means having a cylindrical channel, second means connected to rotate said first means about the axis of its channel, cylindrical float means contained within said channel and having an outer diameter slightly less than the diameter of said channel, said float means being further provided with a center of gravity that is axially aligned with, but radially displaced from, its geometrical center, means substantially plugging, except for small openings, the opposite ends of said cylindrical channel, whereby atmospheric gas may enter said cylindrical channel through said opening and whereby rotation of said first means forces gas between the surface of said float means and the walls of said channel so that gas along the whole circumferential surface of said float means separates said float means from said channel walls, acceleration of said first means along the axis of its channel causing said float means to move relative to said first means along the axis of said first means channel, the degree of such movement being representative of the instantaneous velocity of said first means along the axis of its channel.

3. The apparatus of claim 2 wherein said float means is electrically conductive along its axis and wherein said apparatus includes three electrical conductors secured to said first means and displaced from each other along the axis of said channel, whereby the three conductors and said float means cooperate to provide a capacitive pick-off for measuring displacement of said float means along the channel axis.

4. An integrating acceleration for use in an atmosphere of gas comprising first means having a cylindrical channel, second means connected to rotate said first means about the axis of its channel, cylindrical float means contained within said channel and having an outer diameter slightly less than the diameter of said channel, said float means being further provided with a center of gravity that is axially aligned with, but radially displaced from, its geometrical center, temperature responsive means substantially closing off the opposite ends of said cylindrical channel but providing small openings that enlarge and diminish when ambient temperature increases and decreases, whereby atmospheric gas may enter said cylindrical channel through said openings and whereby rotation of said first means forces gas between the surface of said float means and the walls of said channel so that gas along the whole circumferential surface of said float means separates said float means from said channel walls, acceleration of said first means along the axis of its channel causing said float means to move relative to said first means along the axis of said first means channel, the degree of such movement being representative of the instantaneous velocity of said first means along the axis of its channel.

5. The apparatus of claim 4 wherein said float means is electrically conductive along its axis and wherein said apparatus includes three electrical conductors secured to said first means and displaced from each other along the axis of said channel, whereby the three conductors and said float means cooperate to provide a capacitive pick-off for measuring displacement of said float means along the channel axis.

6. Integrating accelerometer apparatus for use in a gaseous environment comprising first means having a cylindrically shaped bore with flared ends, conically shaped plugs which may be moved along the axis of said bore to provide variable openings which lead to and from said bore, cylindrical float means having slightly smaller diametrical dimensions than said bore and a radially off-center center of gravity, and means for rotating said first means about the axis of its bore whereby a film of gas completely separates said float means from said first means, acceleration of said first means along the axis of said bore causing said float means to be displaced axially within the bore, such displacement being indicative of the instantaneous velocity of said first means along the bore axis.

7. The apparatus of claim 6 wherein said plugs and said means having a cylindrically shaped bore are of such dissimilar materials that said openings enlarge and diminish when the ambient temperature increases and decreases respectively.

8. Accelerometer apparatus for use in a gaseous environment comprising means having a cylindrical channel closed at opposing ends except for narrow openings, means for rotating said means with a cylindrical channel about the axis of its cylindrical channel, and cylindrical bobbin means having a diameter slightly less than the diameter of said cylindrical channel and having a center of gravity radially displaced from the geometrical center of said bobbin means, said center of gravity being however approximately at the axially central part of said bobbin means, whereby rotation of said means having a cylindrical channel creates a circumferential film of gas between that means and said bobin means, and means producing a signal representing the axial displacement of said bobbin means within said channel along the axis of said channel, whereby said signal represents the instantaneous velocity of said means having a cylindrical channel in the direction of the axis of said channel when that means is accelerated in said same direction.

References Cited by the Examiner

UNITED STATES PATENTS

| | | | |
|---|---|---|---|
| 2,950,908 | 8/60 | Rainsberger | 73—503 |
| 2,958,137 | 11/60 | Mueller | 73—516 |
| 2,978,638 | 4/61 | Wing | 73—503 |
| 3,068,704 | 12/62 | Parker | 73—516 |
| 3,109,310 | 11/63 | Slater | 73—516 |

RICHARD C. QUEISSER, *Primary Examiner.*

JAMES J. GILL, *Examiner.*